United States Patent
Jeon

(10) Patent No.: US 6,370,465 B1
(45) Date of Patent: Apr. 9, 2002

(54) SHIFT CONTROL METHOD FOR AUTOMATIC TRANSMISSION

(75) Inventor: Byeong-Wook Jeon, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/637,700

(22) Filed: Aug. 15, 2000

(30) Foreign Application Priority Data

Dec. 10, 1999 (KR) .............................................. 99-56532

(51) Int. Cl.$^7$ .............................................. F16H 61/04
(52) U.S. Cl. ...................................................... 701/58
(58) Field of Search ................................ 477/132, 133, 477/138, 139, 149; 701/58, 59

(56) References Cited

U.S. PATENT DOCUMENTS

| | | | |
|---|---|---|---|
| 5,018,068 A | * 5/1991 | Aoki et al. ............... | 701/58 X |
| 5,063,814 A | * 11/1991 | Baba et al. ................ | 477/161 |
| 5,882,276 A | * 3/1999 | Usuki et al. ................ | 477/120 |
| 5,961,121 A | * 10/1999 | Hoshiya et al. ............. | 477/140 |

* cited by examiner

Primary Examiner—Charles A. Marmor
Assistant Examiner—Ankur Parekh
(74) Attorney, Agent, or Firm—Birch, Stewart, Kolasch, & Birch, LLP

(57) ABSTRACT

In a shift control method for an automatic transmission, it is first determined if an N-N-2 kickdown signal is input, then if is determined if a real shifting time reaches a standard shifting time when the N-N-2 kickdown signal is input. Next, it is determined if a turbine rpm variation is greater than a target turbine rpm variation at a shifting point when the actual shifting time reaches the standard shifting time, and it is determined if overrun occurs at friction elements to be engaged when the turbine rpm variation is greater than the target turbine rpm variation. Next, a hydraulic fluid control duty ratio is learned by adding a predetermined value to a current duty ratio when the overrun occurs, then it is returned to a main routine.

6 Claims, 4 Drawing Sheets

SHIFT CONTROL METHOD FOR AUTOMATIC TRANSMISSION

BACKGROUND OF THE INVENTION (a) Field of the Invention

The present invention relates to a shift control method for an automatic transmission, and more particularly, to a shift control method for an automatic transmission that can reduce shift shock during 4-2 kickdown skip-shifting by learning-controlling a duty ratio of hydraulic fluid for controlling friction elements to be engaged or disengaged.

(b) Description of the Related Art

Shifting is generally performed in an automatic transmission in accordance with changes in throttle valve opening. That is, throttle valve opening is varied through driver manipulation of the accelerator pedal, and such changes in throttle valve opening correspond to different locations on a shift pattern such that shifting is performed.

There are instances when the driver may depress and release (or release then again depress) the accelerator pedal during a short interval of time. With the use of the conventional shift control method, shifting is automatically performed as dictated by the shift pattern. For example, if the driver releases the accelerator pedal during upshifting, the upshifting operation is completed, then shifting is directly performed back into the lower speed. This greatly reduces the quality of shift feel as shock is generated with such frequent shifting over a short time interval. Also, responsiveness deteriorates in the case where, for example, the accelerator pedal is again depressed during a downshift operation.

Particularly, during 4-2 kickdown skip-shifting control, since only hydraulic fluid directed to friction elements which will be engaged in a second speed is duty-controlled, it is impossible to correct hydraulic fluid when tie-up occurs. Accordingly, when over-run occurs by the shortage of hydraulic fluid of friction element to be disengaged, since only the friction element to be engaged is duty-controlled, shift feel deteriorates.

Furthermore, to duty-control hydraulic fluid directed to friction elements to be engaged without using a learning-control, a feed-back duty control which is performed in real time is required. However, it is time-consuming and costly to develop the feedback control.

SUMMARY OF THE INVENTION

The present invention has been made in an effort to solve the above problems.

It is an object of the present invention to provide a shift control method for an automatic transmission that reduces shift shock during the 4-2 kickdown skip-shifting by learning-controlling the duty ratio of hydraulic fluid directed to or released from friction elements to be engaged or disengaged.

To achieve the above objective, the present invention provides a shift control method for an automatic transmission comprising the steps of determining if an N-N-2 kickdown signal is input, determining if a real shifting time reaches a standard shifting time when the N-N-2 kickdown signal is input, determining if a turbine rpm variation is greater than a target turbine rpm variation at a shifting synchronizing point when the actual shifting time reaches the standard shifting time, determining if overrun occurs at friction elements to be engaged when the turbine rpm variation is greater than the target turbine rpm variation, and learning a hydraulic fluid control duty ratio by adding a predetermined value to a current duty ratio when the overrun occurs, then returning to a main routine.

The method may further comprise the steps of determining if overrun occurs at friction elements to be engaged when the turbine rpm variation is less than the target turbine rpm variation, and learning a hydraulic fluid control duty ratio by adding a predetermined value to the current duty ratio when the overrun occurs, then returning to a main routine.

The standard shifting time T is established according to a variation of a vehicle speed on the basis of data mapped by a pre-set program.

The shifting synchronizing point is established when the turbine RPM becomes larger than a value obtained by multiplying an output shaft RPM by the N speed gear ratio.

The method may further comprise the step of returning to the main routine without learning the hydraulic fluid control duty ratio when the overrun does not occur.

The method may further comprise the step of learning a hydraulic fluid control duty ratio by subtracting a predetermined value from a current duty ratio when the overrun does not occur, then returning to a main routine.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
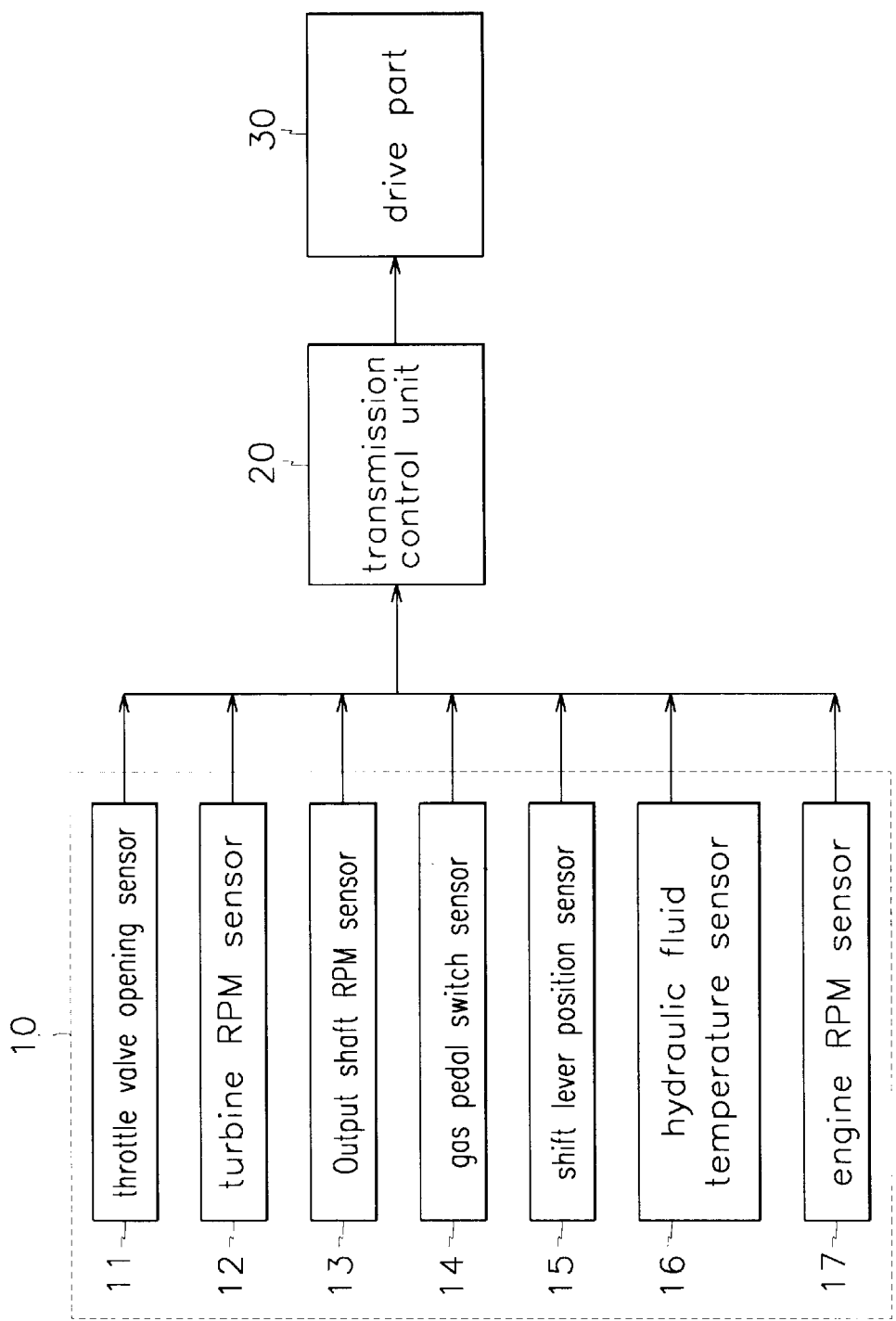
FIG. 1 is a block diagram of a shift control system of an automatic transmission to which the present invention is applied.

FIG. 1 is a block diagram of a shift control system of an automatic transmission to which the present invention is applied.

The shift control system includes: a drive condition detecting part 10 having a throttle valve opening sensor 11 for detecting different opening degrees of a throttle valve and outputting corresponding signals, a turbine RPM sensor 12 for detecting turbine RPMs, an output shaft RPM sensor 13 for detecting output shaft RPMs, a gas pedal switch sensor 14 for detecting an operation of the gas pedal, a shift lever position sensor 15 for detecting a position of the shift lever, a hydraulic fluid temperature sensor 16 for detecting a temperature of the hydraulic fluid, and an engine RPM sensor 17; a transmission control unit 20 for receiving the signals output from the drive condition detecting part 10 and outputting predetermined duty control signals; and a drive part 30 which is duty-controlled according to the predetermined duty control signals output from the transmission control unit 20 to drive a vehicle to shift a shift range to a target shift range.

A shift control method according to a preferred embodiment of the present invention will now be described.

Figure 2:
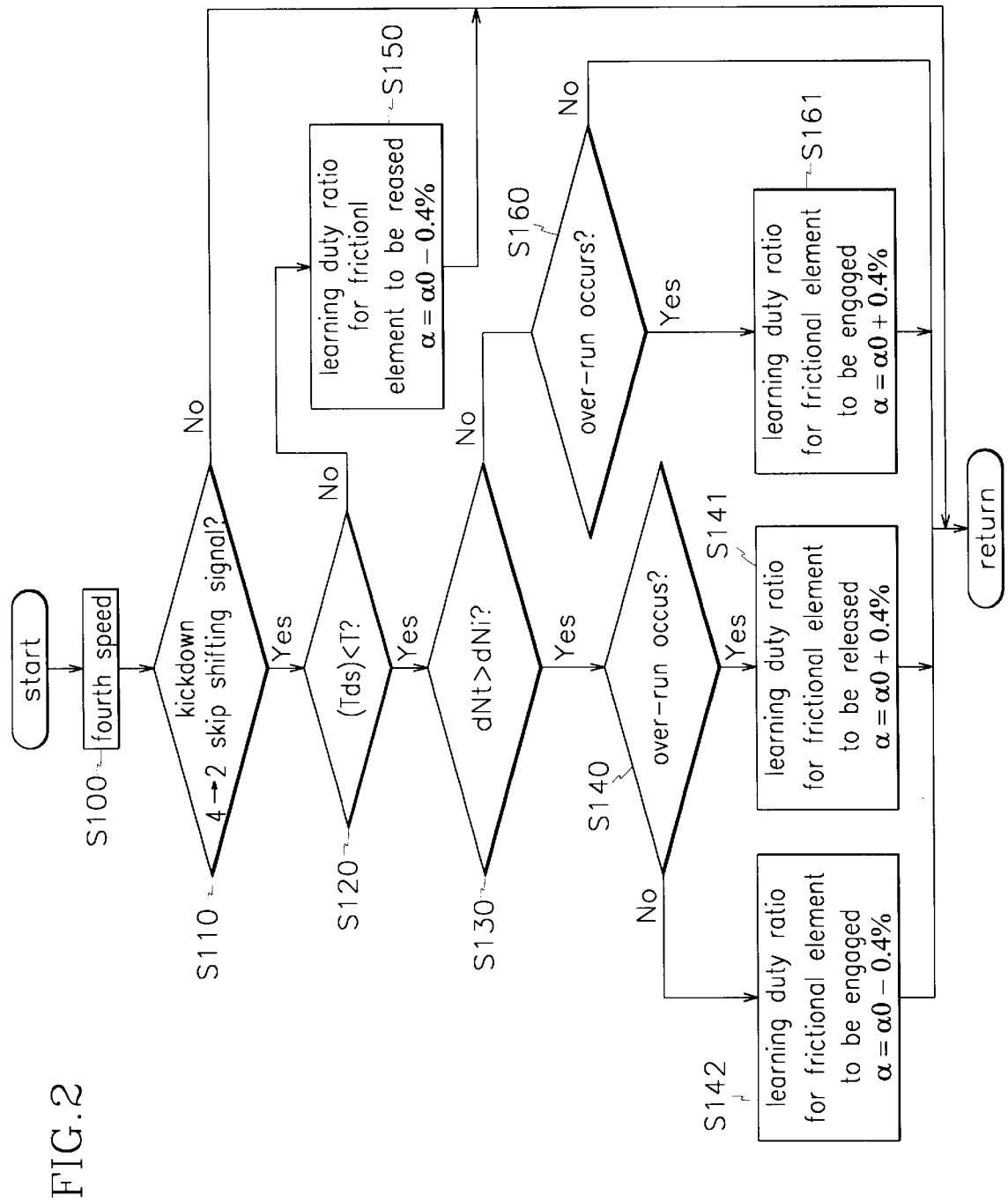
FIG. 2 is a flow chart of a shift control method according to a preferred embodiment of the present invention.

FIG. 2 shows a flow chart of a shift control method according to a preferred embodiment of the present invention. In this embodiment, although a method for controlling a 4-2 kickdown skip-shifting control is illustrated as an example, the present invention is not limited thereto. That is, the concept of the present invention may be applied to, for example, a 5-3 kickdown skip-shifting control.

First, if a signal corresponding to, for example, a fourth speed is transmitted from the drive condition detecting part 10 to the transmission control unit 20, the transmission control unit 20 controls hydraulic fluid of the drive part 30 to drive the vehicle at the fourth speed (S100).

Figure 3:
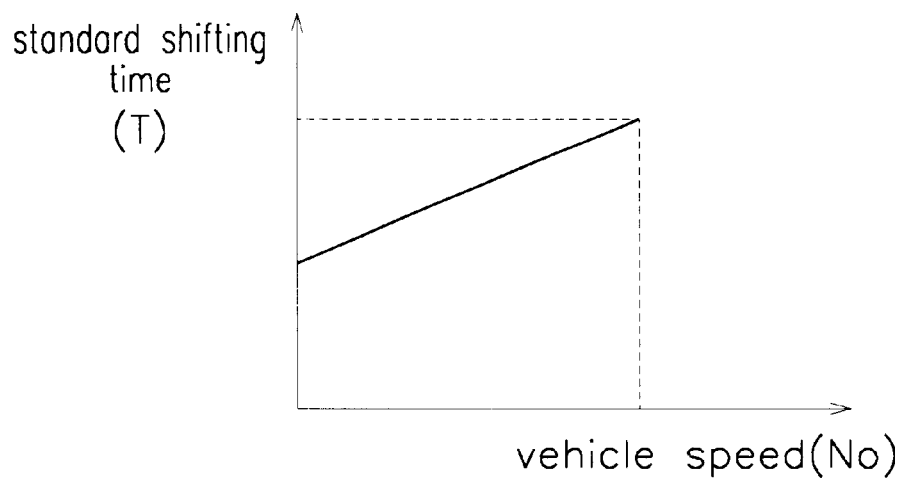
FIG. 3 shows a graph illustrating a standard shifting time with respect to variations of vehicle speed.

In this state, the transmission control unit 20 determines if a 4-2 kickdown skip-shifting control signal is applied by receiving signals regarding the throttle opening, the turbine RPM, the state of the gas pedal, the shift lever position, and the temperature of the hydraulic fluid, from the drive condition detecting part 10 (S110). When the 4-2 kickdown skip-shifting control signal is applied in Step 110, the transmission control unit 20 determines if a standard shifting time T is higher than an actual shifting time Tds (S120). The standard shifting time T is, as shown in FIG. 3, established according to a variation of a vehicle speed No on the basis of data mapped by a pre-set program.

When the standard shifting time T is higher than the actual shifting time Tds in Step S120, the transmission control unit 20 determines if a turbine variation dNt is higher than a target turbine variation dNi (S130). The turbine variation dNt is established by detecting turbine RPMs read from a shifting synchronizing point. For example, the shifting synchronizing point is established when a turbine RPM Nt becomes larger than a value obtained by multiplying an output shaft RPM by a four speed gear ratio.

Figure 4:
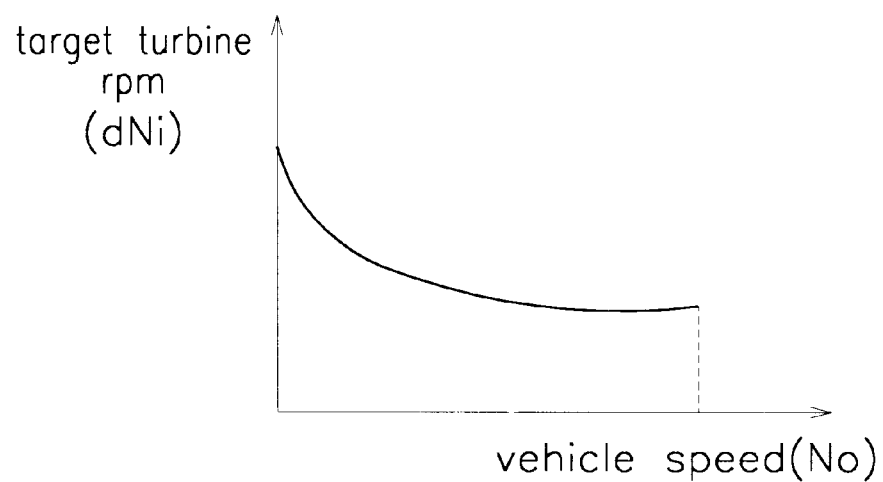
FIG. 4 shows a graph illustrating a target turbine RPM with respect to variations of vehicle speed.

The target turbine variation dNi can be obtained according to a variation of a vehicle speed No as shown in FIG. 4.

When it is determined that the turbine variation dNt is higher than the target turbine variation dNi in Step 130, the transmission control unit 20 determines if over-run occurs at friction elements to be engaged (S140).

In Step 140, if it is determined that the over-run occurs at the friction elements to be engaged, the transmission control unit 20 determines that the run-up occurs after the turbine RPM Nt is quickly increased as hydraulic fluid of friction elements to be released is released too early, then learns a duty ratio for increasing hydraulic fluid of the friction element to be released by adding a predetermined value of 0.4% (S141).

That is, a learned duty ratio α can be calculated according to the following equation.

$$\alpha = \alpha 0 + 0.4\%$$

where, α0 is a current duty ratio, and 0.4 is a standard learning value.

However, in Step 140, if it is determined that over-run does not occur at the friction elements to be engaged, the transmission control unit 20 determines that the run-up does not occur and the turbine RPM Nt is quickly increased as hydraulic fluid of friction elements to be engaged is too high, then learns a duty ratio for reducing hydraulic fluid of the friction element to be engaged by subtracting a predetermined value of 0.4% (S142).

That is, a learned duty ratio α can be calculated according to the following equation.

$$\alpha = \alpha 0 - 0.4\%$$

where, α0 is a current duty ratio, and 0.4% is a standard learning value.

Figure 5:
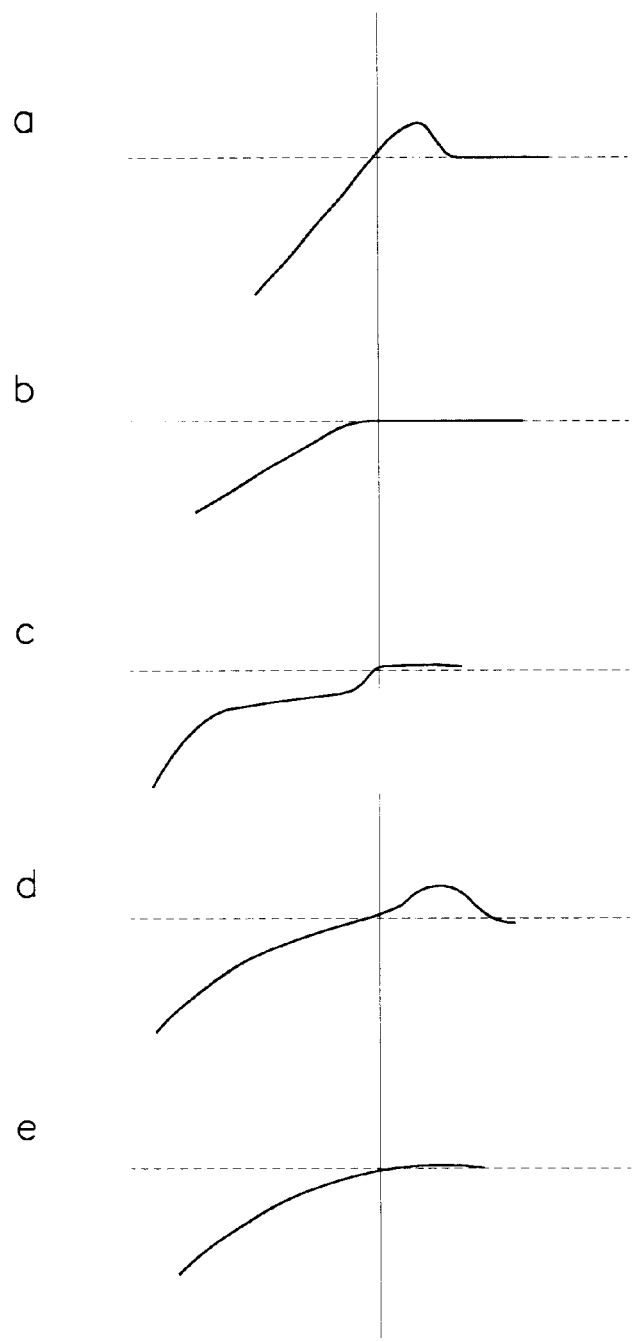
FIG. 5 shows graphs illustrating turbine RPM detecting results which can be applied to the present invention.

In addition, in Step 120, if it is determined that the standard shifting time T is less than the preset shifting time Tds, as shown in FIG. 5c, the transmission control unit 20 determines that the shift time is too long to release the friction element to be released, then learns a duty ratio for reducing hydraulic fluid of the friction element to be released by extracting a predetermined value of 0.4% (i.e., α=α0−0.4%) (S150).

In Step 130, when it is determined that the turbine variation dNt is less than the target turbine variation dNi, the transmission control unit 20 determines if over-run occurs at friction elements to be engaged (S160).

In Step 160, if it is determined that the over-run occurs at the friction elements to be engaged, the transmission control unit 20 determines that the run-up occurs after the turbine RPM Nt is smoothly increased as hydraulic fluid of friction elements to be released is normally released but hydraulic fluid of friction elements to be engaged is too small, then learns a duty ratio for increasing hydraulic fluid of the friction element to be engaged by adding a predetermined value of 0.4% (i.e., α=α0+0.4%) (S161).

However, in Step 160, if it is determined that the over-run does not occur, as shown in FIG. 5e, the transmission control unit 20 does not conduct hydraulic fluid control learning, then returns the process to a main routine.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method for an automatic transmission comprising the steps of:

determining if a signal for kickdown-shifiting from an N-speed gear ratio to an N-2-speed gear ratio is input;

determining if a real shifting time reaches a standard shifting time when the signal is input;

determining if a turbine rpm variation is greater than a target turbine rpm variation at a shifting point when the actual shifting time reaches the standard shifting time;

determining if overrun occurs at friction elements to be engaged when the turbine rpm variation is greater than the target turbine rpm variation; and learning a hydraulic fluid control duty ratio by adding a predetermined value to a current duty ratio when the overrun occurs, then returning to a main routine.

2. The method of claim 1 further comprising the steps of:

determining if overrun occurs at friction elements to be engaged when the turbine rpm variation is less than the target turbine rpm variation; and learning a hydraulic fluid control duty ratio by adding a predetermined value to the current duty ratio when the overrun occurs, then returning to a main routine.

3. The method of claim 1 wherein the standard shifting time T is established according to a variation of a vehicle speed on the basis of data mapped by a pre-set program.

4. The method of claim 1 wherein the shifting synchronizing point is established when the turbine RPM becomes larger than a value obtained by multiplying an output shaft RPM by the N-speed gear ratio.

5. The method of claim 2 further comprising the step of returning to the main routine without learning the hydraulic fluid control duty ratio when the overrun does not occur.

6. The method of claim 1 further comprising the step of learning a hydraulic fluid control duty ratio by subtracting a predetermined value from a current duty ratio when the overrun does not occur, then returning to a main routine.

* * * * *